(12) United States Patent
Drevon et al.

(10) Patent No.: US 11,985,550 B2
(45) Date of Patent: May 14, 2024

(54) SUPPORT OF PS DATA OFF IN A MOBILE SYSTEM

(71) Applicant: Nokia Solutions and Networks Oy, Espoo (FI)

(72) Inventors: Nicolas Drevon, Nozay (FR); Laurent Thiebaut, Nozay (FR); Bruno Landais, Lannion (FR); Curt Wong, Irving, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/314,586

(22) PCT Filed: Jun. 27, 2017

(86) PCT No.: PCT/EP2017/065904
§ 371 (c)(1),
(2) Date: Dec. 31, 2018

(87) PCT Pub. No.: WO2018/007214
PCT Pub. Date: Jan. 11, 2018

(65) Prior Publication Data
US 2019/0357090 A1   Nov. 21, 2019

(30) Foreign Application Priority Data

Jul. 4, 2016 (EP) .................................. 16305844

(51) Int. Cl.
*H04W 36/00* (2009.01)
*H04L 12/14* (2006.01)
(Continued)

(52) U.S. Cl.
CPC ..... *H04W 36/0033* (2013.01); *H04L 12/1407* (2013.01); *H04L 65/1016* (2013.01);
(Continued)

(58) Field of Classification Search
CPC ............... H04W 8/18; H04W 36/0033; H04L 12/1407; H04L 65/1016; H04L 65/1073
(Continued)

(56) References Cited

U.S. PATENT DOCUMENTS 8,867,483 B1 * 10/2014 Vossoughian ........... H04W 8/12
                                                                 370/331
9,787,726 B2 * 10/2017 Russell ............... H04L 65/1016
(Continued)

FOREIGN PATENT DOCUMENTS

EP            3 035 722 A1    6/2016
WO    WO 2015/158363 A1    10/2015
(Continued)

OTHER PUBLICATIONS

Ajay Kumar Priyadarshi, "Diameter Protocol Explained: CX Interface [CSCF-HSS]," Mar. 9, 2015, XP055642849. Retrieved from the internet: URL:http://web.archive./org/web/20153090051135/ https://diameter-protocol.blogspot.com/2013/12/cx-intrface.html.
(Continued)

*Primary Examiner* — Rebecca E Song
*Assistant Examiner* — Vanneilian Lalchinthang
(74) *Attorney, Agent, or Firm* — Lippes Mathias LLP

(57) ABSTRACT

A UE activates a PS Data Off service to block downlink and uplink services except the exempted services determined by the HPLMN. To activate PS Data Off, the UE sends an indication to the MME or SGSN, or additionally to a S-CSCF or an IMS network. The UE may receive a confirmation of the PS Data Off activation and/or a list of exempt services. The MME may contact the HSS to notify about the activation of the PS Data Off and receive indication of support of the service or list of exempted services and send the indication and/or packet filtering per PDN to PDN GW(s). The PDN GW may contact a PCRF to get policy
(Continued)

Figure 1:
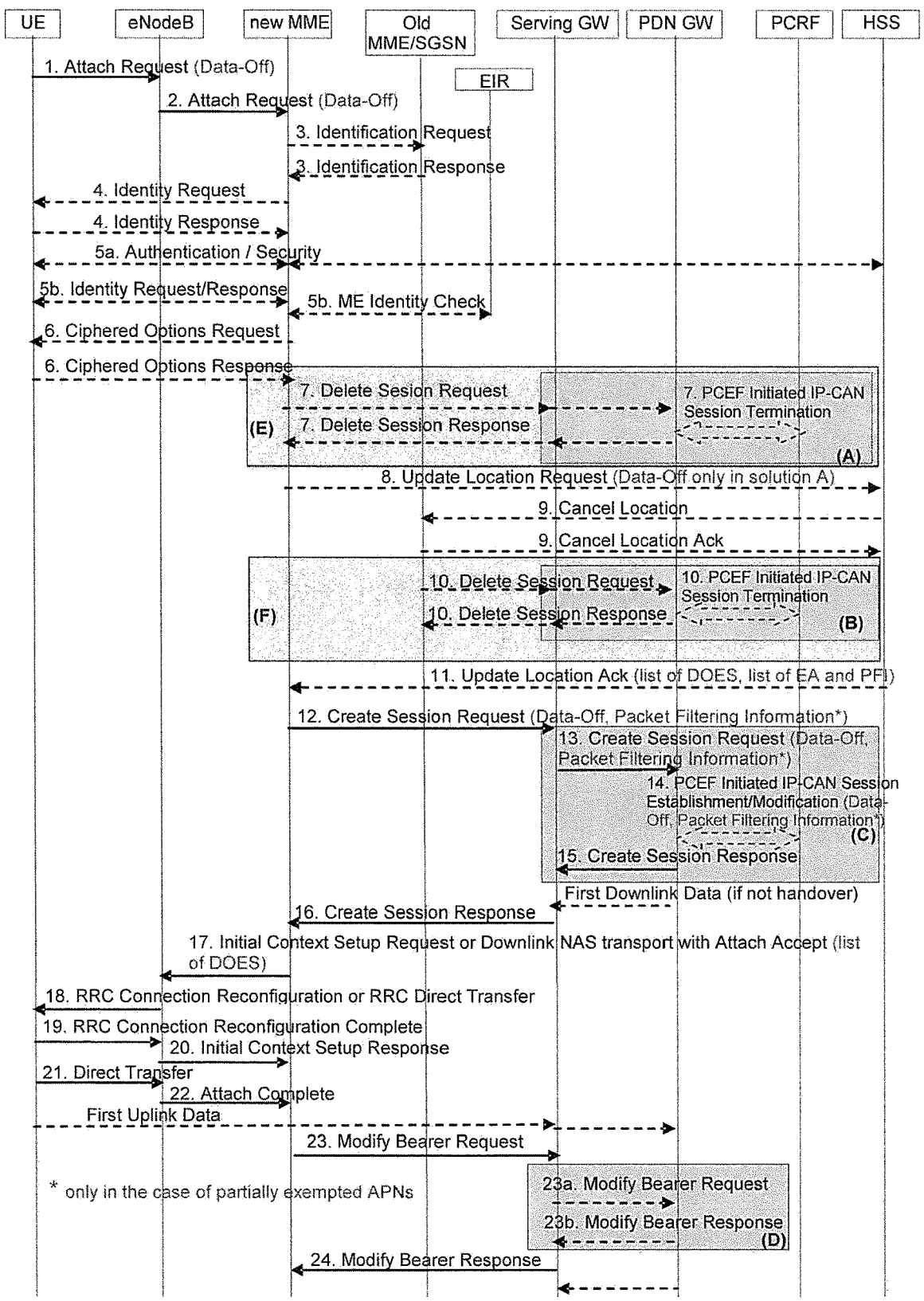

rules. The HSS may provide a list of exempt services to the S-CSCF.

22 Claims, 5 Drawing Sheets

(51) Int. Cl.
    *H04L 12/58*     (2006.01)
    *H04L 65/1016*     (2022.01)
    *H04L 65/1073*     (2022.01)
    *H04W 8/04*     (2009.01)
    *H04W 84/04*     (2009.01)

(52) U.S. Cl.
    CPC ........... *H04L 65/1073* (2013.01); *H04W 8/04* (2013.01); *H04W 84/042* (2013.01)

(58) Field of Classification Search
    USPC ...................................................... 370/331
    See application file for complete search history.

(56) References Cited

U.S. PATENT DOCUMENTS

| | | | | |
|---|---|---|---|---|
| 2010/0142373 A1* | 6/2010 | Jin | ........................... | H04L 47/10 370/230 |
| 2013/0265938 A1* | 10/2013 | Jain | ..................... | H04L 65/4092 370/328 |
| 2014/0254483 A1* | 9/2014 | Zisimopoulos | ....... | H04W 76/22 370/328 |
| 2015/0106454 A1* | 4/2015 | Lim | ......................... | H04W 8/20 709/206 |
| 2016/0088545 A1* | 3/2016 | Ronneke | ................. | H04W 4/14 455/418 |
| 2016/0261754 A1* | 9/2016 | Keller | ................... | H04M 15/61 |
| 2018/0359662 A1* | 12/2018 | Kim | .................... | H04L 65/1016 |
| 2020/0146086 A1* | 5/2020 | Buckley | ................ | H04W 76/16 |

FOREIGN PATENT DOCUMENTS

| | | | | |
|---|---|---|---|---|
| WO | WO-2015158363 A1 * | 10/2015 | ......... | H04L 12/1417 |
| WO | WO 2016/120602 A1 | 8/2016 | | |

OTHER PUBLICATIONS

Anonymous, "IP Multimedia Subsystem—Wikipedia," Wikipedia, May 16, 2016, XP055642931. Retrieved from URL:https://en.,wikipedia.org/w/index.php?title=IP-Multimedia-Subsystem&oldid=720525644.

Orange et al., "Study on PS Data off function," 3rd Generation Partnership Project (3GPP), 3GPP SA WG2 Meeting #115, S2-163129, 5 pages, XP051116585, Nanjing, P.R. China, May 23-27, 2016.

International Search Report for PCT/EP2017/065904 dated Nov. 7, 2017.

* cited by examiner

SUPPORT OF PS DATA OFF IN A MOBILE SYSTEM

The present invention generally relates to mobile communication networks and systems, including packet mobile communication networks and systems.

Descriptions of mobile networks and systems can be found in the literature, such as in particular in Technical Specifications published by standardization bodies such as for example 3GPP (3$^{rd}$ Generation Partnership Project).

In general, in a packet mobile system, a User Equipment (UE) can connect to external networks, also called Packet Data Networks (PDN), via a mobile network (PLMN), also called access network. The access network generally includes a Packet Core Network providing Data connectivity services (such as IP connectivity services). Examples of PDNs include Internet, Intranet, operator's network such as IMS network . . . etc. An example of packet mobile system specified by 3GPP is Evolved Packet System EPS, wherein Data connectivity services are provided by an EPS network (3GPP access network), including a Packet Core Network called Evolved Packet Core (EPC) providing Data connectivity services including providing PDN connection(s) (such as IP connections) to PDN(s). EPS is specified in particular in 3GPP TS 23.401.

A feature, called "PS Data Off" has recently been defined in 3GPP specifications (3GPP TS 22.011), which, when configured by the Home PLMN and activated by the user, prevents transport via PDN connections in 3GPP access networks of all IP packets except IP packets required by 3GPP PS Data Off Exempt Services (set of operator services that are allowed even if the 3GPP PS Data Off feature has been activated in the UE by the user). PS Data Off may be activated based on roaming status.

However the PS Data Off feature has only been defined in terms of service requirements set to the system, and no solution for supporting such requirements has yet been specified.

There is a need to enhance mobile networks and systems to provide support for such new requirements.

Embodiments of the present invention in particular address such needs. Embodiments of the invention are not limited to EPS (also known as 4G), and also apply to packet mobile communication networks e.g. to 5G.

These and other objects are achieved, in one aspect, by a User Equipment UE, configured to support PS Data Off, said UE configured to perform at least one of:
  send a PS Data Off indication towards a Packet Core Network, indicating whether the user wants the blocking of uplink and downlink PS Data for non exempted services or not,
  send a PS Data Off indication towards a IMS Network, indicating whether the user wants the blocking of uplink and downlink PS Data for non exempted services or not.

These and other objects are achieved, in another aspect, by a Home Subscriber Server HSS, configured to support PS Data Off, said HSS configured to:
  store subscriber data including a list of exempted services when PS Data Off is activated.

These and other objects are achieved, in another aspect, by a Packet Core Function capable of serving a UE, such as MME or SGSN, said Packet Core Function configured to support PS Data Off, said Packet Core Function configured to perform at least one of:
  receive a PS Data Off indication from the UE, indicating whether the user wants the blocking of uplink and downlink PS Data for non exempted services or not,
  receive from a HSS an indication on whether the HPLMN supports the PS Data Off feature,
  receive from a HSS a list of exempted services when PS Data Off is activated,
  send to the HSS a PS Data Off indication, indicating whether the user wants the blocking of uplink and downlink PS Data for non exempted services or not,
  send towards a Data connectivity service anchor, such as PDN GW, information on whether PS Data Off is activated,
  for each PDN connection, send towards a Data connectivity service anchor, such as PDN GW, PFI, Packet Filtering Information, indicating which traffic is allowed when PS Data Off is activated on that PDN connection.

These and other objects are achieved, in another aspect, by a Data connectivity anchor, such as PDN GW, configured to support Packet Data Off, said Data connectivity anchor configured to:
  receive information on which traffic is allowed when PS Data Off is activated.

These and other objects are achieved, in another aspect, by a Policy Controller, such as PCRF, configured to support Packet Data Off, said Policy Controller configured to perform at least one of:
  receive information on which traffic is allowed when PS Data Off is activated,
  send to a Data connectivity anchor, such as PDN GW, policy rules, such as PCC rules, based on said information.

These and other objects are achieved, in another aspect, by a S-CSCF, configured to support Packet Data Off, said S-CSCF configured to perform at least one of:
  receive a PS Data Off indication, indicating whether the user wants the blocking of uplink and downlink PS Data for non exempted services or no,
  receive a List of Exempted IMS Services when PS Data Off is activated.

These and other objects are achieved, in another aspect, by method for support of PS Data Off in a packet mobile system, comprising at least one step performed by at least one of the thus configured entities.

Figure 2:
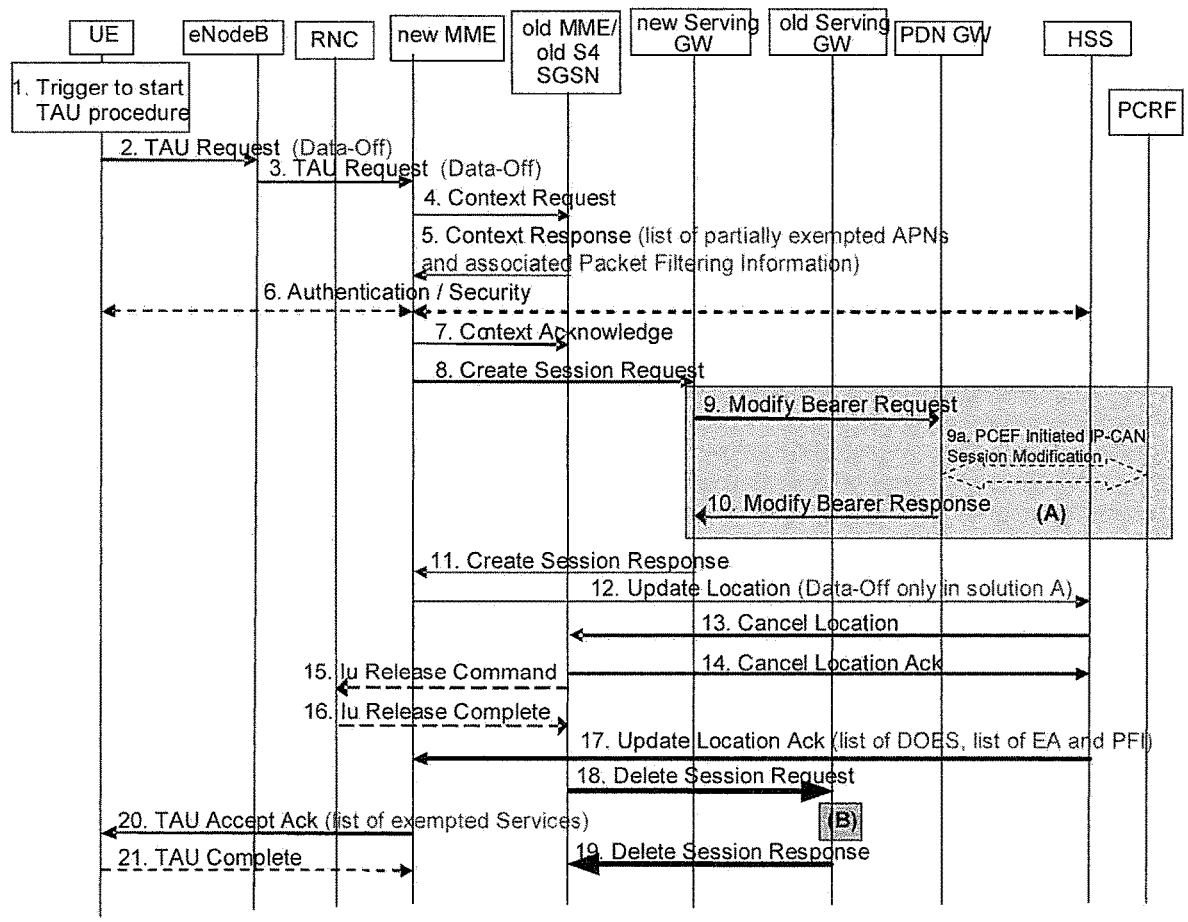
Figure 3:
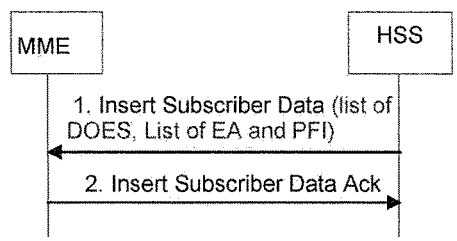
Figure 4:
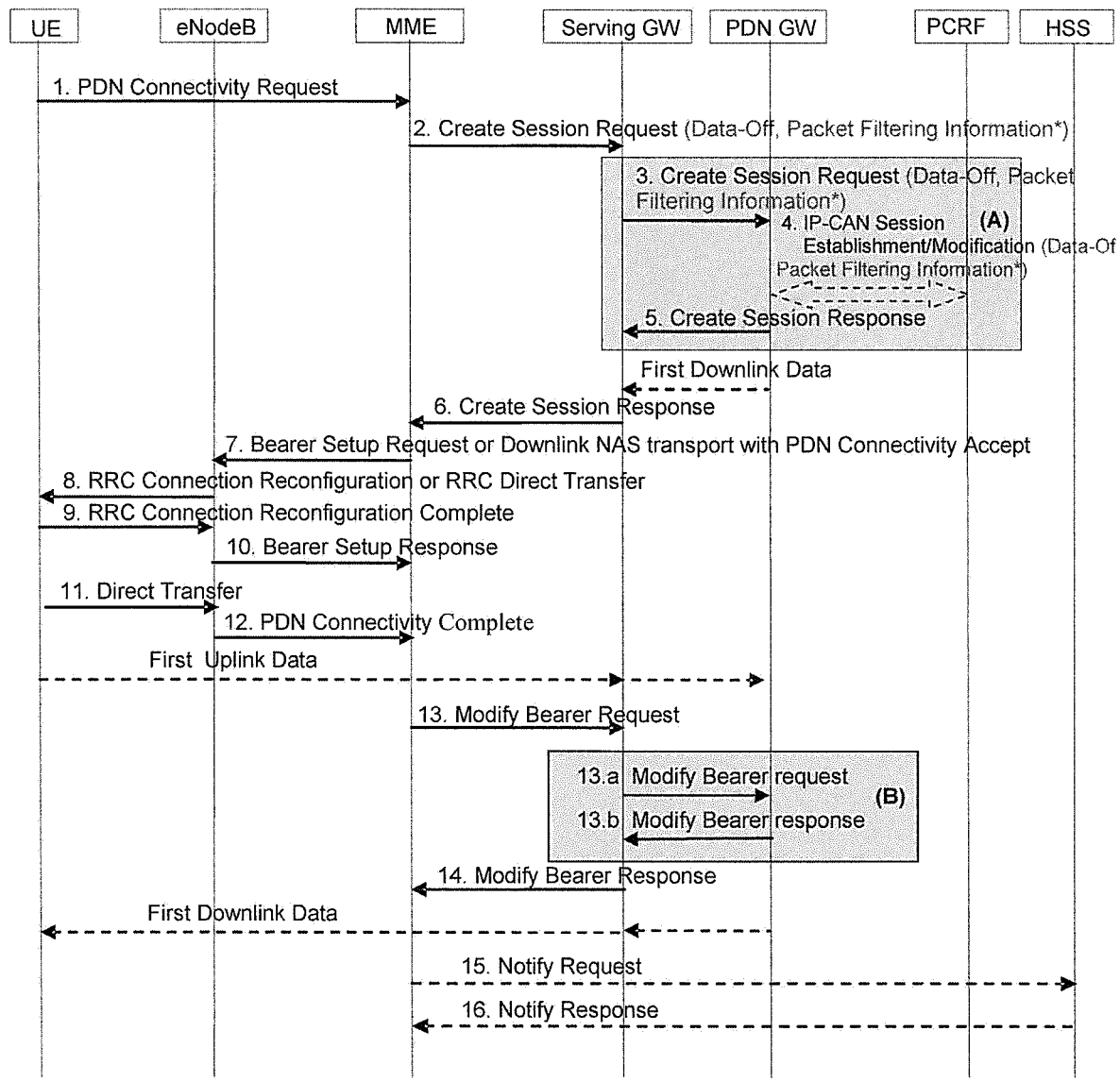
Figure 5:
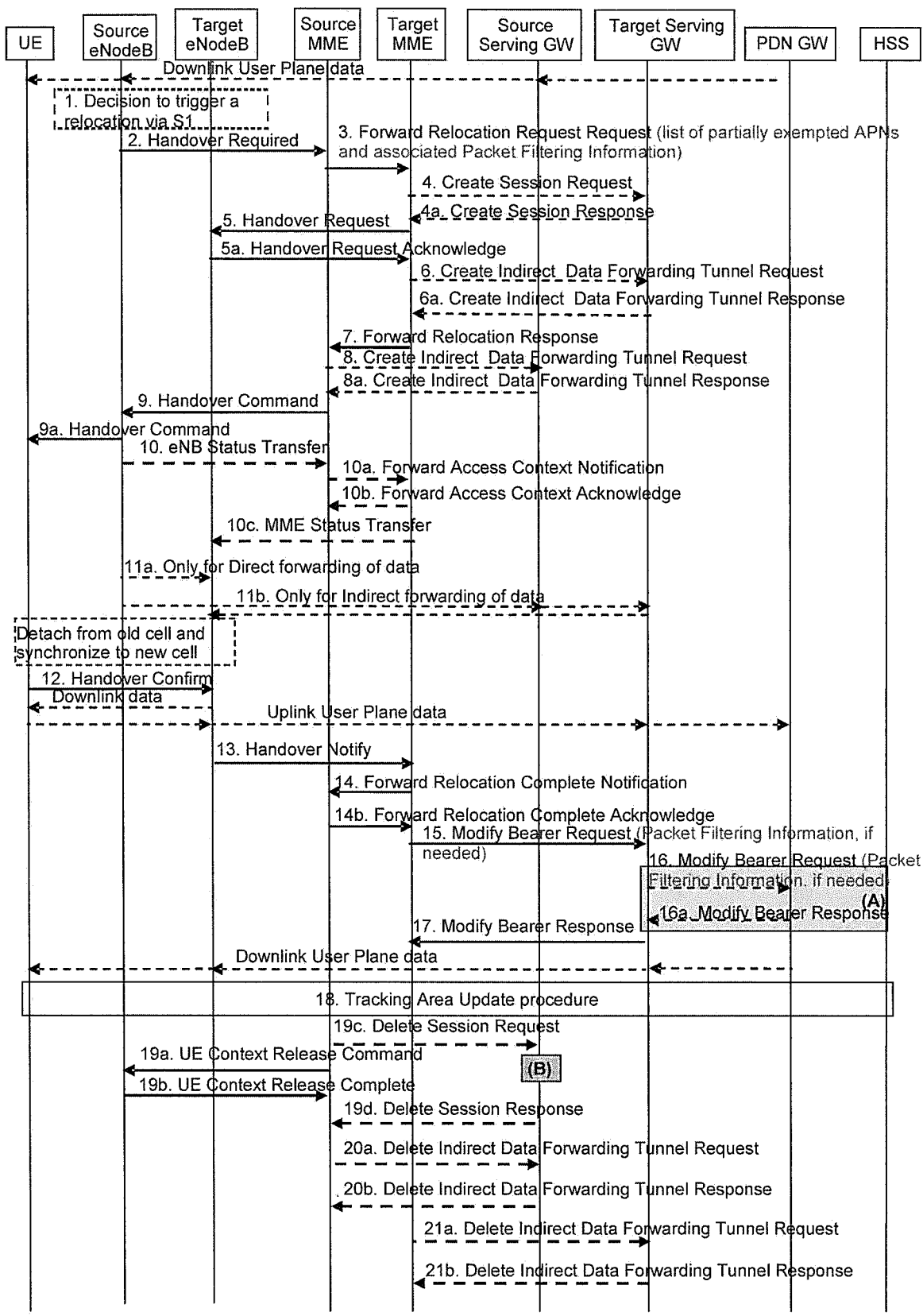
Figure 6:
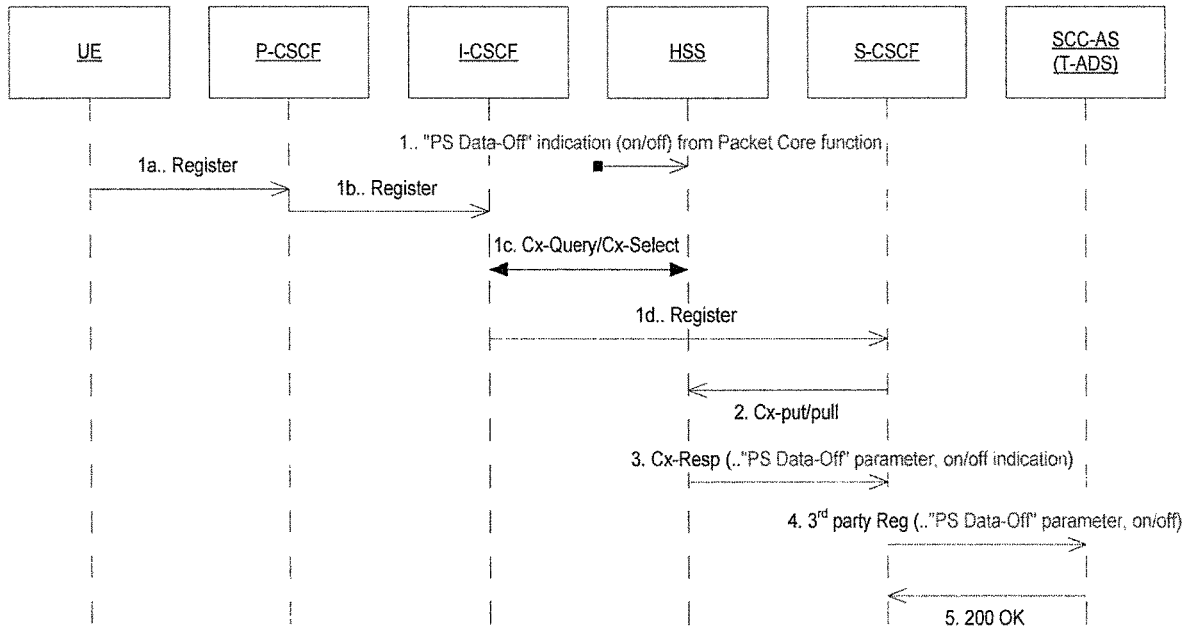
Figure 7:
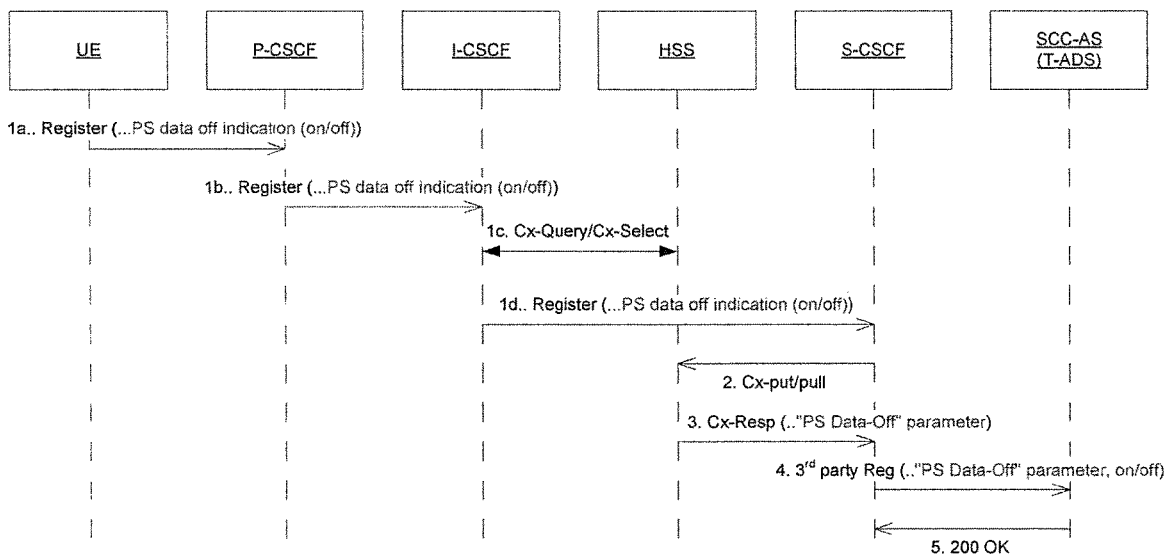

Some embodiments of apparatus and/or methods in accordance with embodiments of the present invention are now described, by way of example only, and with reference to the accompanying drawings, in which:

FIG. 1 is intended to illustrate, in a simplified way, an example of signaling flow for support of PS Data Off, related to Attach procedure, according to embodiments of the invention, FIG. 2 is intended to illustrate, in a simplified way, an example of signaling flow for support of PS Data Off, related to Tracking Area Update procedure, according to embodiments of the invention, FIG. 3 is intended to illustrate, in a simplified way, an example of signaling flow for support of PS Data Off, related to Insert Subscriber Data procedure, according to embodiments of the invention, FIG. 4 is intended to illustrate, in a simplified way, an example of signaling flow for support of PS Data Off, related to UE requested PDN connectivity procedure, according to embodiments of the invention, FIG. 5 is intended to illustrate, in a simplified way, an example of signaling flow for support of PS Data Off, related to S1-based Handover procedure, according to embodiments of the invention, FIG. 6 is intended to illustrate, in a simplified way, a first example of signaling flow for support of PS Data Off, related to how IMS is informed of "PS Data-off", according to embodiments of the invention, FIG. 7 is intended to illustrate, in a simplified way, a second example of signaling flow for support of PS Data Off, related to how IMS is informed of "PS Data-off", according to embodiments of the invention,

ABBREVIATIONS

APN Access Point Name
CN Core Network
EPC Evolved Packet Core
EPS Evolved Packet System
GTP-c GPRS Tunneling Protocol-control plane
HPLMN Home PLMN
HSS Home Subscriber Server
IMS IP Multimedia Subsystem
ISC IMS Service Control
ISD Insert Subscriber Data
IP CAN IP Connectivity Access Network
MME Mobility Management Entity
PCRF Policy and Charging Rules Function
PDN Packet Data Network
PDN GW PDN Gateway
PDP Packet Data Protocol
PDU Protocol Data Unit
PFI Packet Filtering Information
PGWPDN Gateway
PLMN Public Land Mobile Network
PMIP Proxy Mobile IP
PS Packet Services
SCC AS Service Centralization and Continuity Application Server
S-CSCF Serving-Call Session Control Function
SGSN Serving GPRS Support Node
SGW Serving Gateway
SIP Session Initiation Protocol
UE User Equipment
UICC Universal Integrated Circuit Card
USIM Universal Subscriber Identity Module
VPLMN Visited PLMN

DESCRIPTION OF VARIOUS ASPECTS AND/OR EMBODIMENTS OF THE INVENTION

As recalled above, 3GPP PS Data Off is a feature which, when configured by the HPLMN and activated by the user, prevents transport via PDN connections in 3GPP access networks of all IP packets except IP packets required by 3GPP PS Data Off Exempt Services.

The requirements specified for 3GPP PS Data Off are specified in 3GPP TS 22.011 version 14.2.0. These requirements are recalled below.

The 3GPP system shall provide a mechanism by which an operator can configure which operator services are defined as 3GPP PS Data Off Exempt Services for their own subscribers.

When 3GPP PS Data Off is activated in the UE, in order to preserve charging consistency:
the UE shall inform the network that 3GPP PS data Off is activated,
the UE shall cease the sending of uplink IP Packets of all services that are not 3GPP PS Data Off Exempt Services, and
the network shall cease the sending of downlink IP Packets to the UE for all services that are not 3GPP PS Data Off Exempt Services.

NOTE: Disabling of IP Packets on both the uplink and downlink is needed in order to provide consistency of charging between HPLMN and VPLMN, as well as consistency between what the user expects and what the user may be billed for.

3GPP PS Data Off may be activated based on roaming status.

Each of the following operator services shall be configurable by the HPLMN operator on a per PLMN basis to be part of the 3GPP PS Data Off Exempt Services:
MMTel Voice;
SMS over IMS;
USSD over IMS (USSI);
MMTel Video;
particular IMS services not defined by 3GPP, where each such IMS service is identified by an IMS communication service identifier;
Device Management over PS; and
IMS Supplementary Service configuration via the Ut interface using XCAP.

The user should be made aware of the services that are 3GPP PS Data Off Exempt Services.

As recognized by the inventors, possible solutions for supporting these requirements could be based on the user configuring his device to block all the Data traffic on the uplink direction and the network using APN to block the downlink direction. However, as further recognized by the inventors, such possible solutions would have at least following drawbacks:
Such on/off mechanism does not provide enough granularity e.g. to allow the operator to allow services such as for example RCS or Device Management over PS that use Internet APN when Internet APN is blocked.
If the PS Data Off feature is activated while keeping the PDN connection open, application servers or Internet hosts may go on sending downlink IP traffic to the UE without the network being aware that these packets are to be blocked. If the UE does not send any uplink IP packets, then well-managed operator's application servers may close the service session after a while, but Internet hosts might send unsolicited IP packets (e.g. TCP SYN packets, UDP packets, ICMP packets) to the UE without any time limit. As a consequence the user will be charged for downlink IP traffic even though Data Off feature is activated, leading to customer complaints due to unexpected charging,
The IMS network is not aware of PS Data Off, whereas certain IMS services cannot be blocked by the UE.

There is a need to avoid such drawbacks. More generally there is a need to improve support of the PS Data Off feature. Embodiments of the present invention in particular address such needs.

By way of example, following description of embodiments of the invention will be made for EPS (4G). However, as indicated above, embodiments of the invention are not limited to such example and apply to other systems, e.g. 5G.

In the following the "Packet Core Function serving the UE" represents the entity in the Packet Core of the local PLMN that terminates the NAS (Non-Access-Stratum) signaling (defined e.g. in 24.008 or 24.301 or any 5G equivalent) with the UE and controls the Packet Service of the UE e.g. MME, SGSN or their equivalent in a 5G Core.

Embodiments of the invention include part or all of:
- a (new) list of exempted services when PS Data Off is activated is configured and stored in the HSS, per subscriber or for all subscribers.
- a (new) "PS Data-Off" indication sent by the UE to the network, indicating whether the user wants the blocking of uplink and downlink PS Data (for the non exempted services)or not.

Two solutions may be provided. In the first solution (denoted "Solution A" below) the UE activates/deactivates the PS Data Off service using NAS (Non-Access-Stratum messages i.e. signaling to the Packet Core) only, and in the second solution (denoted "Solution B" below) using NAS messages and SIP (Session Initiation Protocol) messages.

Both solutions apply to all 3GPP technologies having a PS domain: GPRS, UMTS, LTE, 5G.

In "solution A", the UE only sends "PS Data-Off" indication to the Packet Core Function serving the UE and the Packet Core Function serving the UE forwards the "PS Data-Off" parameter to the HSS where it is stored in order to be further provided to the IMS network. In "solution B", the UE additionally sends the "PS Data-Off" indication in IMS Registration messages to the IMS network.

- when the PS Data Off is activated, the UE (for the uplink traffic) and the network (Packet Core and IMS) block all the PS data for the non exempted services.
- It should be noted that
- the IMS network needs to be aware because certain IMS services (such as SMSoIMS or USSD over IMS) cannot be blocked by the UE;
- Storing the list of exempted services in the SPR would not allow the UE to receive it before a PDN connection is established, would require SPR to be synchronized with HSS, and would require PCRF to be deployed. Hence it is proposed that the list of exempted services in the network is only stored in the HSS.

In both of these solutions, the UE may also inform the Core Network and IMS that it is capable to support "PS Data Off" service without indicating PS data activation request (on or off), the Network then informs the current "PS Data Off" status in the response message back to UE. This is useful for UE to check the current activation status from the serving PLMN.

The list of exempted services when PS Data Off is activated, stored in the HSS, may be made up of:
- a "list of Data Off Exempted Services" (DOES) which is sent to the Packet Core Function serving the UE for further distribution to the UE. This information is transparent to (not interpreted by) the Packet Core Network Serving Node. When received by the UE, the UE stores it and—in the case of PS Data-Off activated—blocks all PS services except the ones in that list (e.g. MMTel Voice, SMS over IMS, Device Management over PS). The UE may also translate this list into a readable message for the user;
- a "list of "Exempted APNs" (EA) and associated "Packet Filtering Information" (PFI)" for the Packet Core to only allow exempted Packet Core services when PS Data Off is activated;
- a "list of "Exempted IMS services" for the IMS to only allow exempted IMS services when PS Data Off is activated.

In the following the "Packet Core Function serving the UE" represents the entity in the Packet Core of the local PLMN that terminates the NAS (Non-Access-Stratum) signaling (defined e.g. in 24.008 or 24.301 or any 5G equivalent) with the UE and controls the Packet Service of the UE e.g. MME, SGSN or their equivalent in a 5G Core.

Embodiments on How the UE Informs the Core Network on the Activation/Deactivation of PS Data Off and Where is this Information Stored in the Network Embodiments Related to "Solution A" (Using NAS Messages Only):

Part or all of following actions may be performed.

The UE informs the Packet Core Function serving the UE on the activation/deactivation of "PS Data Off" decided by the user, by adding a "PS Data Off" indication in NAS messages such as Attach Request, Tracking Area Update Request, Routing Area Update Request. The "PS Data Off" indication can take two values: activated, deactivated.

The UE initiates signaling (such as Tracking Area Update Request or Routing Area Update Request) to the Packet Core Function serving the UE when the user has changed the PS data Off status.

Also note that embodiments of the invention do not preclude the UE to send "Data-Off" in any other NAS message.

The Packet Core Function serving the UE stores the most recent "PS Data Off" parameter in its UE context.

Note that Data Off is different for Home PLMN (as well as equivalent HPLMNs and PLMN declared as equivalent to HPLMN in the SGSN/MME/5G-Core-MM-entity) and for the foreign PLMNs.

In "solution A", "PS Data-Off" needs then to be forwarded by the Packet Core Function serving the UE to the HSS to enable the HSS to store this information and provide it to the S-CSCF (pushing it when the user is IMS registered or providing it together with IMS subscription data upon S-CSCF request when the UE registers to IMS).

The HSS does never push the "PS Data Off" value to the Packet Core Function serving the UE e.g. upon UE mobility to another Packet Core Function serving the UE (as this would cause synchronisation issues with the UE); instead, any new Packet Core Function serving the UE gets the PS Data Off parameter via NAS signaling (such as Tracking Area Update). Besides, it is not intended to support this new feature with legacy UEs.

Embodiments Related to "Solution B" (Using NAS and SIP REGISTER Messages):

The difference with "solution A" is that instead of requiring the Packet Core Function serving the UE to forward the "PS Data-Off" to the HSS, for the HSS to store it and to provide it to the S-CSCF, the UE sends a SIP message such as SIP REGISTER to the S-CSCF with "PS Data-Off". However, like for "Solution A", the UE also sends the "PS Data Off" parameter to the Packet Core Function serving the UE.

Embodiments Related to the Management and Distribution of the List of Services Which are Allowed When PS Data Off is Activated Because the list of "exempted services when PS Data Off" is activated is managed by the Home PLMN, and because it might be per subscriber, the most straightforward solution is that the HSS is configured, e.g. by O&M, with the list of allowed services when PS Data Off is activated. This list may be common to all subscribers or per subscriber. There is a list for each PLMN that have roaming agreements with the Home PLMN. This list might be the same for all foreign PLMNs, but different from the list of the HPLMN.

Embodiments Related to Informing the Packet Core Function Serving the UE and the UE About the "List of Data Off Exempted Services" for Packet Core:

The list of exempted services when PS Data Off is activated for the visited/registered PLMN may be added to the Subscription data, sent by the HSS to the Packet Core Function serving the UE in all messages which contain the Subscription data.

The list of exempted services when PS Data Off is activated may be made up of part or all of:

A "list of Data Off Exempted Services" (DOES) which is sent to the UE, transparently by the Packet Core Function serving the UE, and is stored by the Packet Core Function serving the UE for further distribution to the UE. When received by the UE, the UE stores it and—in the case of PS Data-Off activated —blocks all PS services except the ones in that list (e.g. MMTel Voice, SMS over IMS, Device Management over PS), and translate this list into a readable message to the user;

A "list of "Exempted APNs" (EA) and associated "Packet Filtering Information" (PFI)". Exempted APNs can be totally exempted, in which case, the Packet Filtering Information is not present, or partially exempted APN, in which case the Packet Filtering info is present and characterizes the IP flows which are exempted from PS Data Off.

The UE may be informed during the Attach procedure in the Attach Accept message, during the TAU procedure in the Tracking Area Update Accept message and/or during the RAU procedure in the Routing Area Update Accept message via the addition of a new parameter "list of Data Off Exempted services ".

Embodiments Related to Informing the S-CSCF About the "List of Exempted IMS Services":

The S-CSCF may be informed by the HSS on the "list of exempted IMS services" (e.g. MMTEL voice, MMTEL video, SMS over IMS, etc). The list of "exempted IMS services when PS Data Off" may be a list of ICSI's (IMS Communication Service Identifier) or any other identification.

1—Informing the S-CSCF on a change of the list of IMS exempted services for IMS registered UEs: This may be done for IMS registered UEs using e.g. the Cx-Update_Subscr_Data (Push-Profile-Request) message via adding "list of exempted IMS services". See TS 29.228 annex A.2

2—Informing the S-CSCF on the list of IMS exempted services at IMS registration: This may be done during IMS registration by using e.g. the Server-Assignment-Answer message in which the "list of exempted IMS services" parameter has been added.

Embodiments Related to Informing the IMS Network on the Activation/Deactivation of PS Data Off by the UE Embodiments Related to "Solution A" (Using NAS Messages Only):

In this solution, the HSS provides the "PS Data-Off" value to the S-CSCF:

Informing the S-CSCF on the "PS Data-Off" value at IMS registration: This may be done during IMS registration by using e.g. the Server-Assignment-Answer message in which "PS Data-Off" parameter has been added for already IMS registered UEs this may be done using e.g. the Cx-Update_Subscr_Data (Push-Profile-Request) message sent to the S-CSCF via adding "PS Data-Off" to that message when this parameter has changed.

Embodiments Related to "Solution B" (Using NAS and SIP register Messages):

In this solution, the UE may directly inform the S-CSCF of the "PS Data-Off" value by adding the "PS Data-Off" value to a SIP message such as the IMS REGISTER message; This may take place at initial registration to IMS as well as by sending a new SIP message such as IMS REGISTER message when "PS Data-Off" has changed.

When S-CSCF receives the "PS Data-Off" parameter as described above, it may also inform Terminating Access Domain Selection (T-ADS) function in the SCC AS of these parameter via $3^{rd}$ party registration over ISC interface. T-ADS, as defined in 3GPP TS 23.292, is used for selecting the appropriate terminating access (PS or CS) for delivering the call. PS access include 3GPP packet-switched domain (i.e., EPS, 3G GPRS, 5G, and WiFi), while CS means circuit-switch domain. Allowing T-ADS to receive a list of "allowed IMS services when PS Data Off" can improve the delivery logic, i.e, T-ADS attempts the first delivery over CS domain or WiFi access because "Data off" service does not allow UE to use 3GPP PS RAT for the type of service being requested.

Embodiments related to Informing the PDN GW and/or the PCRF on the activation/deactivation of PS Data Off by the UE and on which uplink and downlink traffic is allowed when PS Data Off is activated:

As said above, the list of "list of exempted APNs" and associated "Packet Filtering Information" for the visited/registered PLMN may be sent by the HSS to the Packet Core Function serving the UE via the Update Location Answer and/or Insert Subscriber Data Request messages and/or the equivalent interaction in case of 5G. In addition, the UE may send "PS Data Off" parameter in NAS messages such as Attach Request, Tracking Area Update Request, Routing Area Update Request.

Therefore, the Serving Node has all the necessary information to decide what to do, and may perform part or all of following actions:

When "PS Data-Off" is activated by the UE,

The Packet Core Function serving the UE should release the Data connectivity services (PDP contexts, PDN connections, PDU sessions, . . . ) that are not targeting an APN in the "list of exempted APNs" : it sends a Session Delete Request to the Data connectivity service anchor (GGSN, PDN GW, PDU session anchor, . . . ) via the Serving GW. It also sends NAS message(s) towards the UE to deactivate Data connectivity service (s); The MME/SGSN may add a "PS Data off" indication in the signaling used to delete a PDN connection, when this deletion has been due to the activation of the Data off by the UE. This information may be stored in CDR (Charging Data Record).

For the already established Data connectivity services whose APN is in the "list of exempted APNs", the Packet Core Function serving the UE either may not do anything (if there is no "Packet Filtering Information" related to the APN—i.e. the APN is totally exempted from PS Data Off) or, if the APN is partially exempted, the Packet Core Function serving the UE may need to inform the Data connectivity service anchor (e.g. PDN GW in case of EPC). In case of EPC this may be done by sending a GTP-C (e.g. Modify Bearer Request) or PMIP message which contains "Packet Filtering Information" to the PDN GW via the Serving GW. This may require the "Packet Filtering Information" to be added to the Modify Bearer Request message;

When the "PS Data-Off" is in activated state
  If the Packet Core Function serving the UE receives from the HSS updated subscription information indicating that an APN is removed from the "list of exempted APNs", the Packet Core Function serving the UE may release the Data connectivity services (e.g. PDN connections) that are not targeting an APN in the "list of exempted APNs" as described above;
  If there is a change in the "Packet Filtering Information" related to an APN, the HSS may inform the Packet Core Function serving the UE by sending a Insert Subscriber Data message, and in case a Data connectivity services (e.g. PDN connection) targeting the APN is already established the Packet Core Function serving the UE informs the Data connectivity service anchor of the change of "Packet Filtering Information". For example in case of EPC the MME/SGSN may notify the PDN GW by sending a GTP-C (e.g. Modify Bearer Request) or PMIP message via the Serving GW;
  When a new PDN connection is established, and if the APN is in the list of exempted APNs, the Packet Core Function serving the UE may inform the PDN GW by sending a "PS Data Off" indication in the Create Session Request message. If the APN is partially exempted from PS Data Off, this may require the "Packet Filtering Information" to be added to Create Session Request message;

Embodiments Related to Informing the PCRF on the Activation/Deactivation of PS Data Off by the UE and on Which Uplink and Downlink Traffic is Allowed When PS Data Off is Activated If PCRF is deployed, it may be necessary or desirable that, rather than immediately applying the "Packet Filtering Information" at the Data connectivity service anchor (e.g. PDN GW in case of EPC) when this information has been received from the Packet Core Function serving the UE (possibly via the Serving GW), to instead inform the Policy Controller (PCRF) on the Packet Filtering Information related to the APN of the IP-CAN session. As an alternative to the solution by which Data connectivity service anchor (e.g. PDN GW in case of EPC) enforces the traffic per the Packet Filtering Information received from Packet Core Function serving the UE, the Data connectivity service anchor may just relay the Packet Filtering Information to the Policy Controller (PCRF) which may be the entity responsible for sending consistent PCC rules which are enforced by the Data connectivity service anchor (e.g. PDN GW in case of EPC). This may be performed by adding Packet Filtering Information to the IPCAN Session Establishment/Modification messages over Gx interface.

Embodiments Related to Actions Performed During Mobility Events

At mobility inducing a change of Packet Core Function serving an UE It may not be required to pass the "PS Data-Off" and/or the "list of exempted APNs and associated Packet Filtering Information" between Packet Core Functions serving the UE as a Tracking Area Update procedure always takes place after the handover (which results in the new Packet Core Function receiving the same information from the HSS).

At inter-serving Node mobility, the source MME or SGSN may include in the Context Response and Forward Relocation Request messages a "PS-data-OFF-handled indication" to notify that it supports "PS-data-OFF" and has correctly updated the PDN GW with "Packet Filtering Information" related to the APN for partially exempted APNs. If the target MME or SGSN (supporting the feature) has not received the "PS-data-OFF-handled indication" information from the source MME or SGSN while the user subscription info in HSS contains "Packet Filtering Information" related to the APN, the target MME or SGSN knows that it has to update the PDN GW with "PS Data-Off" indication and "Packet Filtering Information". It may also be necessary that the target serving node may have to update the PDN GW if the source and target serving nodes are not in the same PLMN and these PLMNs have different Data-Off strategies.

To deal with Packet Core Function that does not support the feature, the UICC may contain a "list of Data Off Exempted Services" (DOES). A DOES received from the Packet Core Function serving an UE supersedes the DOES received from the USIM Some examples of call flows related to main impacted procedures (taking 4G EPC as an example) are illustrated in FIGS. 1 to 5.

1) Embodiments Related to Attach Procedure (FIG. 1)

The Attach procedure specified in 3GPP TS 23.401 clause 5.3.2.1 may be modified by providing part or all of:
Adding "PS Data Off" in the Attach Request message and, only in solution A, in the Update Location Request message,
Adding the "list of Data Off Exempted Services" (DOES) and the "list of Exempted APNs and associated Packet Filtering Information" in the Update Location Ack message (or Insert Subscriber Data Request msg—not represented in the figure),
Adding the PS Data Off status and the "list of Data Off Exempted Services" (DOES) in the Attach Accept message,
Adding the "Packet Filtering Information" and the "PS Data Off" in the Create Session Request messages between the MME, SGW and PGW if the requested APN is partially exempted as well as towards PCRF in IPCAN session establishment/modification."Data-Off" may be useful for charging.

2) Embodiments Related to Tracking Area Update Procedure (FIG. 2)

Same principle as in the Attach procedure for the Tracking Area Update procedure of 3GPP TS 23.401 clause 5.3.3.1, with the addition of the list of partially exempted APNs and the "PS-data-OFF-handled indication" in the Context Response message.

When the UE changes the PS data off status from "not activated" to "activated" the Packet Core Function serving the UE (MME/SGSN) should release the Data connectivity services (PDP contexts, PDN connections, PDU sessions, . . . ) that are not targeting an APN in the "list of exempted APNs".

The MME/SGSN may add a "PS Data off" indication in the signaling used to delete a PDN connection, when this deletion has been due to the activation of the Data off by the UE. This information may be stored in CDR (Charging Data Record).

3) Embodiments Related to Insert Subscriber Data Procedure (FIG. 3)

The Insert Subscriber Data procedure specified in 3GPP TS 23.401 clause 5.3.9.2 may be modified by adding the "list of Data Off Exempted Services" and the "list of Exempted APNs and associated Packet Filtering Information" in the Insert Subscriber Data message.

4) Embodiments Related to UE Requested PDN Connectivity Procedure (FIG. 4)

The UE requested PDN connectivity specified in 3GPP TS 23.401 clause 5.10.2 may be modified by adding the "Packet Filtering Information" and "Data-Off" in the Create Session Request messages between MME, SGW and PGW, and towards PCRF in IPCAN session establishment/modification. "Data-Off" may be useful for charging.

5) Embodiments Related to S1-Based Handover (FIG. 5)

S1-based handover specified in 3GPP TS 23.401 clause 5.5.1.2 may be modified by adding the list of partially APNs and the "PS-data-OFF-handled indication in the Forward Relocation Request message between the MME/SGSNs.

Embodiments of How IMS is Informed of "PS Data-Off" With "Solution-A" (FIG. 6)

In this solution, HSS is aware of the PS data-off activation status from Packet core Function and may be provided to S-CSCF during the Cx-Put/Cx-Pull procedure (step 3). This may include the list of IMS services being provisioned with PS Data-off service. S-CSCF may then send this info to T-ADS via $3^{rd}$ party registration.

Embodiments of How IMS is Informed of "PS Data-Off" With Solution-B (FIG. 7).

In this solution, UE may indicate the PS data-off activation status to IMS in IMS Registration procedure. As part of the Cx-Put/Cx-Pull procedure (step 3), HSS may return a list of IMS services being provisioned with PS Data-off service. S-CSCF may then send this info along with the activation status to T-ADS via $3^{rd}$ party registration.

Various aspects and/or embodiments of the invention include (though not being limited to) following aspects and/or embodiments.

Some aspects are related to a User Equipment.

Various embodiments are provided, including (though not being limited to) following embodiments, which may be taken alone or in combination, according to various combinations.

In an embodiment, said User Equipment is configured to support PS Data Off.

In an embodiment, said User Equipment is configured to perform at least one of:
 send a PS Data Off indication towards a Packet Core Network, indicating whether the user wants the blocking of uplink and downlink PS Data for non exempted services or not,
 send a PS Data Off indication towards a IMS Network, indicating whether the user wants the blocking of uplink and downlink PS Data for non exempted services or not.

In an embodiment, said User Equipment is configured to perform at least one of:
 send the PS Data Off indication towards a Packet Core Function serving the UE,
 send the PS Data Off indication towards a S-CSCF serving the UE.

In an embodiment, said User Equipment is configured to perform at least one of:
 send the PS Data Off indication towards a Packet Core Function serving the UE, in a NAS message such as Attach Request, or TA Update Request, or RA Update Request,
 initiate signalling (such as Tracking Area Update Request or Routing Area Update Request) to the Packet Core Function serving the UE when the user has changed the PS data Off status,
 send the PS Data Off indication towards a S-CSCF serving the UE, in a SIP message, such as SIP Register.

In an embodiment, said User Equipment is configured to perform at least one of:
 receive information on whether the PS Data Off service is activated in the network,
 receive information on a list of Data Off Exempted Services, DOES,
 store received information on the list of DOES,
 in case of PS Data Off activated, block all PS services except the ones in the list of DOES.
 Inform the User on the list of DOES In an embodiment, said User Equipment is configured to perform at least one of:
 receive information on whether the PS Data Off service is activated in the network;
 receive information on a list of Data Off Exempted Services, DOES, from a Packet Core Function serving the UE, in a NAS message such as Attach Accept, or TA Update Accept, or RAU Update Accept.

Other aspects are related to a Home Subscriber Server HSS.

Various embodiments are provided, including (though not being limited to) following embodiments, which may be taken alone or in combination, according to various combinations.

In an embodiment, said Home Subscriber Server HSS is configured to support PS Data Off.

In an embodiment, said HSS is configured to:
 store subscriber data including a list of exempted services when PS Data Off is activated.

In an embodiment:
 said list of exempted services includes a list of exempted services per PLMN having roaming agreements with the Home PLMN.

In an embodiment said HSS is configured to perform at least one of:
 send said list of exempted services to a Packet Core Function serving a User Equipment UE, in a message containing subscription data, such as Update Location Ack or Insert Subscriber Data, send an indication that the HPLMN supports the PS Data Off feature to the Packet Core Function serving a User Equipment UE, in a message containing subscription data, such as Update Location Ack or Insert Subscriber Data, send said list of exempted services and said indication that the HPLMN supports the PS Data Off feature to a Packet Core Function serving a User Equipment UE only if this Packet Core Function indicated support of the PS Data Off feature to the HSS.

In an embodiment said HSS is configured to:

send to a Packet Core Function serving a User Equipment UE, a list of exempted services when PS Data Off is activated, for the registered PLMN In an embodiment:

said list of exempted services includes at least one of:
  a list of DOES, Data Off Exempted Services,
  a list of EA, Exempted APNs, and for partially exempted APNs, their associated PFI, Packet Filtering Information,
  a list of Exempted IMS Services.

In an embodiment said HSS is configured to perform at least one of:

send at least one of a list of DOES, and a list of EA and possibly associated PFI, to a Packet Core Function serving a User Equipment UE, send a List of Exempted IMS Services, towards a S-CSCF serving a User Equipment UE.

In an embodiment said HSS is configured to perform at least one of:

receive a PS Data Off indication from a Packet Core Network Function serving a User Equipment UE, indicating whether the user wants the blocking of uplink and downlink PS Data for non exempted services or not, store said indication, provide said indication to a S-CSCF serving said UE.

In an embodiment said HSS is configured to perform at least one of:

provide said indication to a S-CSCF serving said UE, in a message such as Cx-Update-Subscr_Data (Push-Profile-Request) for an already IMS registered UE, or in a Server-Assignment-Answer message at IMS registration.

Other aspects are related to a Packet Core Function, such as MME or SGSN.

Various embodiments are provided, including (though not being limited to) following embodiments, which may be taken alone or in combination, according to various combinations.

In an embodiment, said Packet Core Function is configured to support PS Data Off.

In an embodiment, said Packet Core Function is configured to perform at least one of:

receive a PS Data Off indication from the UE, indicating whether the user wants the blocking of uplink and downlink PS Data for non exempted services or not, receive from a HSS an indication on whether the HPLMN supports the PS Data Off feature, receive from a HSS a list of exempted services when PS Data Off is activated, send to the HSS a PS Data Off indication, indicating whether the user wants the blocking of uplink and downlink PS Data for non exempted services or not, send towards a Data connectivity service anchor, such as PDN GW, information on whether PS Data Off is activated, for each PDN connection, send towards a Data connectivity service anchor, such as PDN GW, PFI, Packet Filtering Information, indicating which traffic is allowed when PS Data Off is activated on that PDN connection.

In an embodiment, said Packet Core Function is configured to perform at least one of:

receive the PS Data Off indication from the UE, in a NAS message such as Attach Request, or TA Update Request, or RA Update Request, receive a list of exempted services from the HSS, in a message such as Location Update Ack or Insert Subscriber Data.

In an embodiment, said Packet Core Function is configured to perform at least one of:

receive from the HSS an indication on whether the HPLMN supports the PS Data Off feature, receive from the HSS a list of Data Off Exempted Services, DOES, send a list of DOES to the UE, receive from the HSS a list of Exempted APNs, EAs, and associated Packet Filtering Information PFI, send information to the UE on whether the PS Data Off service is activated in the network.

In an embodiment, said Packet Core Function is configured to perform at least one of:

send towards the UE a list of Data Off Exempted Services, DOES, in a NAS message such as Attach Accept, or TA Update Accept, or RA Update Accept, send towards the UE information on whether the PS Data Off service is activated in the network, in a NAS message such as Attach Accept, or TA Update Accept, or RA Update Accept.

In an embodiment, said Packet Core Function is configured to:

for each PDN connection, send towards a Data connectivity service anchor, such as PDN GW, PFI, Packet Filtering Information, indicating which traffic is allowed when PS Data Off is activated for that PDN connection, in a message such as a GTP-c message or a PMIP message.

In an embodiment, said Packet Core Function is configured to:

receive from a HSS information indicating if an APN is removed from a list of Exempted APNs, EAs, and/or if Packet Filtering Information PFI associated with an APN of a list of Exempted APNs is changed.

In an embodiment, said Packet Core Function is configured to perform at least one of:

when PS Data Off is activated by the UE:
  release Data connectivity services that are not targeting an APN in a list of Exempted APNs, EAs, and indicate in the release related signaling that the release is due to Data-Off activation,
  inform a Data connectivity service anchor, such as PDN GW, of Packet Filtering Information PFI associated with a partially exempted APN, when PS Data Off is in an activated state:
  if an APN is removed from a list of exempted APNs, release Data connectivity services that are targeting this APN, and indicate in the release related signaling that the release is due to Data-Off activation,
  if Packet Filtering Information PFI associated with a partially exempted APN is changed, inform a Data connectivity service anchor, such as PDN GW, of this change, when a new PDN connection is established towards a partially exempted APN, inform a Data connectivity service anchor, such as PDN GW, of Packet Filtering Information PFI associated with this partially exempted APN.

In an embodiment, said Packet Core Function is configured to:
at a mobility event between two Packet Core Functions, provide a "PS-data-OFF-handled indication" to notify the target Packet Core Function that it supports "PS-data-OFF" and has correctly updated the PDN GW with "Packet Filtering Information" related to the APN for partially exempted APNs, in a message such as Context Response or Forward Relocation Request.

In an embodiment, said Packet Core Function is configured to:
at a mobility event between two Packet Core Functions, if "PS-data-OFF-handled indication" has not been received in a message such as Context Response or Forward Relocation Request, verify from user subscription information received from HSS if it should send PFI Packet Filtering Information associated with partially exempted APNs to a Data connectivity anchor, such as PDN GW.

Other aspects are related to a Data connectivity anchor, such as PDN GW.

Various embodiments are provided, including (though not being limited to) following embodiments, which may be taken alone or in combination, according to various combinations.

In an embodiment, said Data connectivity anchor is configured to support PS Data Off.

In an embodiment, said Data connectivity anchor is configured to:
receive information on which traffic is allowed when PS Data Off is activated.

In an embodiment:
said information includes PFI, Packet Filtering Information, associated with a partially exempted APN.

In an embodiment, said Data connectivity anchor is configured to:
receive information on which traffic is allowed when PS Data Off is activated, in a message such as a GTP-c message, such as Create Session Request or Modify Bearer Request, or in a PMIP message.

In an embodiment, said Data connectivity anchor is configured to:
enforce traffic filtering per said information.

In an embodiment, said Data connectivity anchor is configured to:
relay said information to a policy controller, such as PCRF, such as in a IP CAN Session Establishment/modification message over Gx interface.

Other aspects are related to a policy controller, such as PCRF.

Various embodiments are provided, including (though not being limited to) following embodiments, which may be taken alone or in combination, according to various combinations.

In an embodiment, said policy controller is configured to support PS Data Off.

In an embodiment, said policy controller is configured to perform at least one of:
receive information on which traffic is allowed when PS Data Off is activated,
send to a Data connectivity anchor, such as PDN GW, policy rules, such as PCC rules, based on said information.

Other aspects are related to a S-CSCF.

Various embodiments are provided, including (though not being limited to) following embodiments, which may be taken alone or in combination, according to various combinations.

In an embodiment, said S-CSCF is configured to support PS Data Off.

In an embodiment, said S-CSCF is configured to perform at least one of:
receive a PS Data Off indication, indicating whether the user wants the blocking of uplink and downlink PS Data for non exempted services or no,
receive a List of Exempted IMS Services when PS Data Off is activated.

In an embodiment, said S-CSCF is configured to perform at least one of:
receive said PS Data Off indication from a User equipment UE in a SIP message such as a SIP Register,
receive said PS Data Off indication from a HSS,
receive said List of Exempted IMS Services from a HSS.

In an embodiment, said S-CSCF is configured to:
inform a T-ADS of a SCC AS about a received PS Data off indication.

Other aspects are related to method(s) for support of PS Data Off in a mobile system, comprising at least one step performed by at least one mobile system entity, including (though not limited to) at least one of the thus configured entities.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
at least one processor; and
at least one memory including computer program code;
the at least one memory and the computer program code configured to, with the at least one processor, cause the apparatus at least to:
send, towards a packet core network of a third generation partnership project network, an indication indicating whether packet switched data off is activated for the apparatus;
receive an indication indicating a first list of exempted internet protocol multimedia subsystem services that are allowed in the case packet switched data off is activated for the apparatus;
receive an indication indicating a second list of exempted internet protocol multimedia subsystem services that are allowed in the case packet switched data off is activated for the apparatus; and
restrict uplink packet-switched signalling, to the third generation partnership project network, based on the first list of exempted internet protocol multimedia allowed in the case packet switched data off is activated for the apparatus,
wherein the first list is valid for a home public land mobile network of the apparatus, and the second list is valid for a public land mobile network that is different from the home public land mobile network of the apparatus.

2. The apparatus according to claim 1,
wherein the at least one memory and the computer program code are configured to, with the at least one processor, cause the apparatus at least to:
send, towards the packet core network of the third generation partnership project network in non-access-stratum signalling, the indication indicating whether packet switched data off is activated for the apparatus.

3. The apparatus according to claim 2,
wherein the non-access-stratum signalling comprises at least one of the following:
an attach request,
a tracking area update request, or
a routing area update request.

4. The apparatus according to claim 1,
wherein the at least one memory and the computer program code are configured to, with the at least one processor, cause the apparatus at least to:
receive, from the packet core network of the third generation partnership project network in non-access-stratum signalling, the indication indicating the first list of exempted internet protocol multimedia subsystem services that are allowed in the case packet switched data off is activated for the apparatus.

5. The apparatus according to claim 4,
wherein the non-access-stratum signalling comprises at least one of the following:
an attach accept,
a tracking area update accept, or
a routing area update accept.

6. The apparatus according to claim 1,
wherein the at least one memory and the computer program code are configured to, with the at least one processor, cause the apparatus at least to:
restrict uplink packet-switched signalling, to the third generation partnership project network, based on the second list of exempted internet protocol multimedia allowed in the case packet switched data off is activated for said apparatus.

7. The apparatus according to claim 1,
wherein the at least one memory and the computer program code are configured to, with the at least one processor, cause the apparatus at least to:
send, towards an internet protocol multimedia system network of the third generation partnership project network, an indication indicating whether packet switched data off is activated for the apparatus.

8. The apparatus according to claim 7,
wherein the at least one memory and the computer program code are configured to, with the at least one processor, cause the apparatus at least to:
send, towards the internet protocol multimedia system network of the third generation partnership project network in session initiation protocol signalling, the indication indicating whether packet switched data off is activated for the apparatus.

9. The apparatus according to claim 8,
wherein the session initiation protocol signalling comprises at least one of the following:
a session initiation protocol register message at initial registration of the apparatus to the internet protocol multimedia system network, or
a session initiation protocol register message after initial registration of the apparatus to the internet protocol multimedia system network, based on a change of the indication indicating whether packet switched data off is activated for the apparatus.

10. A method comprising:
sending, towards a packet core network of a third generation partnership project network, an indication indicating whether packet switched data off is activated for a user equipment;
receiving an indication indicating a first list of exempted internet protocol multimedia subsystem services that are allowed in the case packet switched data off is activated for the user equipment;
receiving an indication indicating a second list of exempted internet protocol multimedia subsystem services that are allowed in the case packet switched data off is activated for the user equipment;
restricting uplink signalling, to the third generation partnership project network, based on the first list of exempted internet protocol multimedia allowed in the case packet switched data off is activated for said user equipment,
wherein the first list is valid for a home public land mobile network of the user equipment, and the second list is valid for a public land mobile network that is different from the home public land mobile network of the user equipment.

11. The method according to claim 10, comprising:
sending, towards the packet core network of the third generation partnership project network in non-access-stratum signalling, the indication indicating whether packet switched data off is activated for the user equipment.

12. The method according to claim 11,
wherein the non-access-stratum signalling comprises at least one of the following:
an attach request,
a tracking area update request, or
a routing area update request.

13. The method according to claim 10, comprising:
receiving, from the packet core network of the third generation partnership project network in non-access-stratum signalling, the indication indicating the first list of exempted internet protocol multimedia subsystem services that are allowed in the case packet switched data off is activated for the user equipment.

14. The method according to claim 13,
wherein the non-access-stratum signalling comprises at least one of the following:
an attach accept,
a tracking area update accept, or
a routing area update accept.

15. The method according to claim 10, comprising:
restricting uplink signalling, to the third generation partnership project network, based on the second list of exempted internet protocol multimedia allowed in the case packet switched data off is activated for said user equipment.

16. The method according to claim 10, comprising:
sending, towards an internet protocol multimedia system network of the third generation partnership project network, an indication indicating whether packet switched data off is activated for the user equipment.

17. The method according to claim 16, comprising:
sending, towards the internet protocol multimedia system network of the third generation partnership project network in session initiation protocol signalling, the indication indicating whether packet switched data off is activated for the user equipment.

18. The method according to claim 17,
wherein the session initiation protocol signalling comprises at least one of the following:
- a session initiation protocol register message at initial registration of the user equipment to the internet protocol multimedia system network, or
- a session initiation protocol register message after initial registration of the user equipment to the internet protocol multimedia system network, based on a change of the indication indicating whether packet switched data off is activated for the user equipment.

19. An apparatus comprising:
at least one processor; and
at least one memory including computer program code;
the at least one memory and the computer program code configured to, with the at least one processor, cause the apparatus at least to:
send, towards an internet protocol multimedia system network of the third generation partnership project network, an indication indicating whether packet switched data off is activated for the apparatus;
receive an indication indicating a first list of exempted internet protocol multimedia subsystem services that are allowed in the case packet switched data off is activated for the apparatus;
receive an indication indicating a second list of exempted internet protocol multimedia subsystem services that are allowed in the case packet switched data off is activated for the apparatus; and
restrict uplink packet-switched signalling, to the third generation partnership project network, based on the first list of exempted internet protocol multimedia allowed in the case packet switched data off is activated for the apparatus,
wherein the first list is valid for a home public land mobile network of the apparatus, and the second list is valid for a public land mobile network that is different from the home public land mobile network of the apparatus.

20. The apparatus according to claim 19,
wherein the at least one memory and the computer program code are configured to, with the at least one processor, cause the apparatus at least to:
restrict uplink packet-switched signalling, to the third generation partnership project network, based on the second list of exempted internet protocol multimedia allowed in the case packet switched data off is activated for said apparatus.

21. A method comprising:
sending, towards an internet protocol multimedia system network of the third generation partnership project network, an indication indicating whether packet switched data off is activated for the user equipment;
receiving an indication indicating a first list of exempted internet protocol multimedia subsystem services that are allowed in the case packet switched data off is activated for the user equipment;
receiving an indication indicating a second list of exempted internet protocol multimedia subsystem services that are allowed in the case packet switched data off is activated for the user equipment;
restricting uplink signalling, to the third generation partnership project network, based on the first list of exempted internet protocol multimedia allowed in the case packet switched data off is activated for said user equipment,
wherein the first list is valid for a home public land mobile network of the user equipment, and the second list is valid for a public land mobile network that is different from the home public land mobile network of the user equipment.

22. The method according to claim 21, comprising
restricting uplink packet-switched signalling, to the third generation partnership project network, based on the second list of exempted internet protocol multimedia allowed in the case packet switched data off is activated for said apparatus.

* * * * *